United States Patent [19]

Nakashima et al.

[11] Patent Number: 5,364,685
[45] Date of Patent: Nov. 15, 1994

[54] LAMINATED PANEL WITH LOW REFLECTANCE FOR RADIO WAVES

[75] Inventors: Hiroshi Nakashima; Yoshihiro Yano; Yasunobu Iida, all of Mie, Japan

[73] Assignee: Central Glass Company, Limited, Ube, Japan

[21] Appl. No.: 925,682

[22] Filed: Aug. 7, 1992

[30] Foreign Application Priority Data

Aug. 13, 1991 [JP] Japan ............................. 3-203035
Aug. 27, 1991 [JP] Japan ............................. 3-215609

[51] Int. Cl.$^5$ ..................... D06N 7/04; H01Q 15/02
[52] U.S. Cl. ............................. 428/155; 428/167;
428/172; 428/209; 428/213; 428/215; 428/333;
296/84.1; 343/909
[58] Field of Search ............... 428/156, 172, 155, 167,
428/49, 192, 209, 210, 213, 215, 333, 334, 432,
433, 434; 296/84.1; 343/972, 909

[56] References Cited

U.S. PATENT DOCUMENTS 3,396,400  8/1968  Kelly et al. .................. 343/872
4,479,131 10/1984  Rogers et al. ................ 343/872
5,162,145 11/1992  Schaefer ...................... 428/209

FOREIGN PATENT DOCUMENTS 0358090   3/1990  European Pat. Off. .
2518828  12/1981  France .
62-193304  4/1988  Japan .

OTHER PUBLICATIONS

Lee et al., "Simple Formulas for Transmssions . . . ", IEEE Antennas & Propagation Magazine, vol. 30, No. 5, Sep. '82, pp. 904–909.

Primary Examiner—Donald J. Loney
Attorney, Agent, or Firm—Keck, Mahin & Cate

[57] ABSTRACT

The matter of concern is the reflection of a radio wave such as a television broadcast wave from a laminated panel having a substrate low in reflectance for radio waves and a layer relatively high in reflectance for radio waves. The reflection is greatly reduced by dividing the reflective layer into a plurality of discontinuous segments by a series of relatively narrow slits such that the width of each segment in the direction parallel to the direction of the electric field of the radio wave is not greater than ⅓ of the wavelength of the radio wave. The invention is suitable for application to a heat reflecting glass with a heat reflecting film having a surface resistivity below about 500 Ω/□, and in that case it is preferable that the width of each segment of the heat reflecting film is not greater than 1/20 of the wavelength.

25 Claims, 5 Drawing Sheets

LAMINATED PANEL WITH LOW REFLECTANCE FOR RADIO WAVES

BACKGROUND OF THE INVENTION

This invention relates to a laminated panel having a layer which is relatively low in electric resistivity but is so devised as to efficiently transmit radio waves such as television broadcast waves. A typical example of the laminated panel is a glass panel provided with a heat reflecting film.

In receiving television broadcast waves an annoying problem is the appearance of ghost images which are mostly attributed to reflections of the broadcast waves from buildings.

In many of recent buildings glass panes or panels occupy large areas of the exterior surfaces, and often it is desired to use glass panels coated with a film of a metal or a metal compound that is relatively low in electric resistivity mainly for the purpose of reducing transmittance for solar radiation. Such films coated on glass panels reflect radio waves at very high reflectance and often offer a serious obstacle to the reception of television broadcast waves, but it is impracticable to solve this problem by applying a radio wave absorber to the coated glass panels. Therefore, in each building it becomes necessary to use uncoated glass panels in a surface or surfaces on which radio waves will impinge even though coated glass panels are used in other surfaces. Since most of coated glass panels for architectural use have certain colors, the exterior surfaces of the building using coated glass panels and the exterior surface(s) using uncoated glass panels assume different colors which may be out of harmony. Besides, the restriction on the use of heat insulating glass is unfavorable for airconditioning of the building.

SUMMARY OF THE INVENTION

The present invention is concerned with a laminated or coated panel having a layer which is relatively low in electric resistivity, and it is an object of the invention is to greatly reduce the reflectance of that layer for radio waves which may impinge on the laminated panel.

Also it is an object of the invention to provide a heat reflecting glass which is sufficiently high in reflectance for solar radiation and very low in reflectance for radio waves such as television broadcast waves.

A laminated panel according to the invention has a substrate which is low in reflectance for radio waves and a layer which is relatively high in reflectance for radio waves and is characterized in that the aforementioned layer (will be referred to as the reflective layer) is divided into a plurality of discontinuous segments by a series of slits such that the width of each segment in a direction parallel to the direction of the electric field of a radio wave which will impinge on the laminated panel is not greater than 1/20 of the wavelength of the radio wave.

The segmentalization according to the invention brings about a great reduction in the reflectance of the reflective layer for the mentioned radio wave and also for similarly polarized radio waves having longer wavelengths. If desired the reflective layer may be divided into segments in a grid pattern by a combination of the aforementioned series of slits and another series of slits which cross the aforementioned slits.

Laminated panels according to the invention can be embodied in various architectural materials to reduce reflections of, for example, television broadcast waves.

A preferred embodiment of the invention is a heat reflecting glass panel having a heat reflecting layer which lies over a surface of a glass plate and has a surface resistivity not higher than 500 $\Omega/\square$. In the heat reflecting glass panel the heat reflecting layer is divided into a plurality of discontinuous segments by a series of slits such that the width of each segment in a direction parallel to the direction of of the electric field of a radio which will impinge on the heat reflecting glass panel is not greater than 1/20 of the wavelength of the radio wave. In this case it is suitable that the width of each of the slits is in the range from 0.05 to 5 mm.

In a heat reflecting glass according to the invention the reflectance of the heat reflecting layer for a radio wave such as a television broadcast wave can be reduced to nearly 0% so that the heat reflecting glass becomes nearly equivalent to the uncoated glass plate itself in respect of transmittance for the radio wave concerned. However, the heat reflecting performance is hardly marred by the segmentalization of the heat reflecting layer insofar as the segmentalization is made by sufficiently narrow slits.

Heat reflecting glasses according to the invention can be used in both buildings and vehicles. When a heat reflecting glass according to the invention is used as a vehicle window glass there is no problem in providing an antenna on or in the window glass for the reception of radio and/or television broadcast waves since the segmented heat reflecting layer efficiently transmits the incoming waves.

DESCRIPTION OF THE PREFERRED EMBODIMENTS

Figure 1:
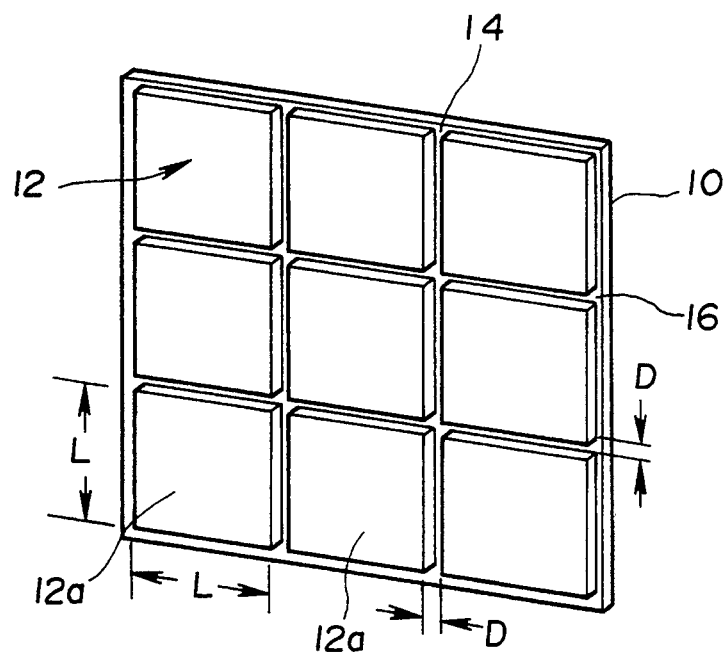
FIG. 1 is a perspective view of a laminated panel which is an example of the invention.

FIG. 1 is an explanatory illustration of a laminated panel according to the invention. The laminated panel consists of a substrate 10 which is low in reflectance for radio waves and an outer layer 12 which is relatively high in reflectance for radio waves. For example, the substrate 10 is a glass plate, and the outer layer 12 is a heat reflecting film having a relatively low surface resistivity. The outer layer 12 is divided into a plurality of square segments 12a by a plurality of vertical slits 14 and a plurality of horizontal slits 16. That is, each segment 12a is spaced from any of the adjacent segments 12a. The purpose of segmenting the outer layer 12 is to reduce reflectance of the outer layer 12 for a radio wave having a given wavelength and also radio waves having longer wavelengths. The length L of one side of each square segment 12a is not longer than ⅓ of the aforementioned given wavelength. The width D of each slit 14, 16 is not strictly limited, but usually D is shorter than about 5 mm.

The substrate 10 may be either a flat plate or a curved plate. In the case of a glass substrate either a colorless glass or a color glass can be used, and it is optional to use a tempered glass or a laminated glass. Examples of substrate materials other than glass are mortar, concrete, ceramics and synthetic resins.

The outer layer 12 is either a coating deposited on the surface of the substrate 10 or a film, sheet or plate bonded to the substrate 10, and in either case the outer layer 12 may be a laminate. Usually the material of the outer layer 12 is a metal or a metal compound, such as a metal oxide or nitride, which is relatively low in electrical resistivity, or a combination of a metal and another metal or a metal compound. Besides, it is also possible to use a glass or synthetic resin plate having a radio wave reflecting coating. In general the merit of the present invention is appreciable when the surface resistivity of the outer layer 12 is below about 1 kΩ/□.

Figure 2:
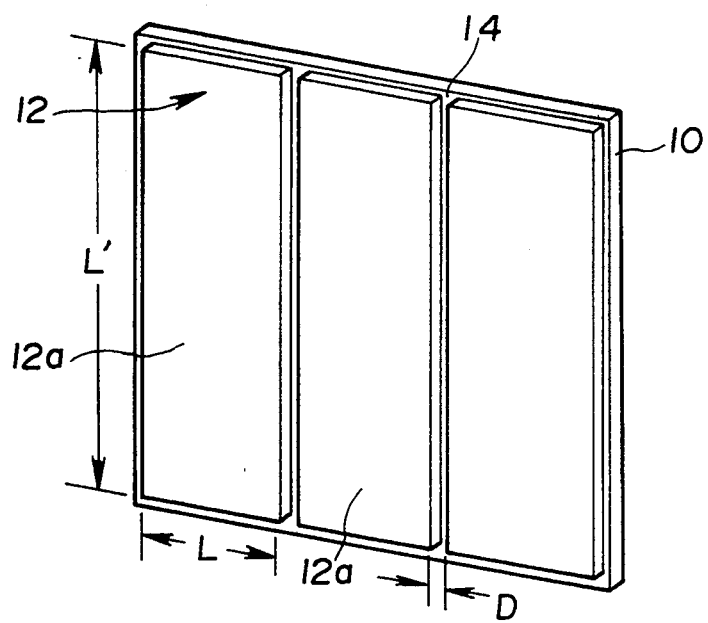
FIG. 2 is a perspective view of a laminated panel which is another example of the invention.

When the outer layer 12 is divided into the small segments 12a by forming vertical slits 14 and horizontal slits 16 as shown in FIG. 1, the reflectance of the laminated panel reduces for both horizontally polarized radio waves (with electric field in a horizontal plane) and vertically polarized radio waves (with electric field in a vertical plane). When the incoming radio waves are always horizontally polarized waves the horizontal slits 16 in FIG. 1 can be omitted. Such a modification is illustrated in FIG. 2. In the laminated panel of FIG. 2 the outer layer 12 is divided by vertical slits 14 into a plurality of vertically elongate, rectangular segments 12a such that the length L of the horizontal sides of each rectangular segment 12a is not longer than ⅓ of the shortest wavelength of radio waves that will be incident on the outer layer 12 of the panel, and in this case the length L' off the vertical sides of each segment 12a is not a matter of importance. In the same sense, when the incoming radio waves are always vertically polarized waves it suffices to divide the outer layer 12 by horizontal slits into a plurality of horizontally elongate, rectangular segments (as shown in FIG. 2) such that the length of the vertical sides of each rectangular segment is not longer than ⅓ of the aforementioned shortest wavelength. In any case it is not necessary to divide the other layer 12 into segments 12a of the same size.

The principle of the present invention is as follows.

When a plane wave is incident on a scatterer a conduction current or polarization current flows in the scatterer, and the flow of such a current becomes a secondary radiation source which emits an electromagnetic wave as a reflection of the incident electromagnetic wave. More particularly, the incidence of the incoming wave does not cause electrons to move about over the whole length of the scatterer but causes electrons to oscillate at a certain point tuning with the frequency of the incident electromagnetic wave. The oscillation of electrons creates a small domain of a high electron density, and there occurs a shift of the position of the high electron density domain as an important factor in the causation of reflection of the incident electromagnetic wave. A reduction in the size of the scatterer with respect to the ratio of the length (L) of the scatterer to the wavelength λ of the incoming wave results in narrowing of a region in which the oscillating electrons can move, and consequently the reflectance of the scatterer for the electromagnetic wave decreases.

Referring to FIG. 2 for the sake of convenience, it will be understood that the reflection of radio waves by the segmented outer layer 12 of the laminated panel can be further decreased by enlarging the width D of the slits 14. However, undue enlargement of the slit width D will be against the purpose of providing the outer layer 12 and in some cases will mar the appearance of the laminated panel. In many cases it will be desirable that the slit width D is narrower than about 5 mm. However, it is impermissible to unlimitedly narrow the slit width D. When a high-frequency radio wave such as a television broadcast wave is incident on the outer layer 12 a displacement current according to the Maxwell's definition is produced in the segments 12a the outer layer 12. If the width D of the slits 14 is extremely narrow the displacement current skips across the slits 14, whereby the apparently spaced segments 12a are electrically united together. From another aspect, it is difficult to make the slit width D narrower than about 0.05 mm even though a laser beam is used to form the slits 14. Experiments have proved that when the slit width D is 0.05 mm the segmented outer layer efficiently transmits incoming radio waves of high frequencies up to 10 GHz. Accordingly a practically minimum value of the slit width D is about 0.05 mm.

The present invention is very suitable for application to a heat reflecting glass having a heat reflecting film which is relatively low in electrical resistivity. An electrically conductive film (or thin layer) is high in permeability to radio waves if reflection can be neglected. When a radio wave with a frequency f is perpendicularly incident on a conductive film having a thickness t (m), the permeability E of the film to the radio wave is given by $E = \exp(-\alpha t)$, where $\alpha$ is an attenuation coefficient of the conductive film, and $\alpha = 4.82 \cdot \pi \cdot f^{\frac{1}{2}}$. For example, when the film thickness t is 50 nm and the frequency f is 100 MHz, the permeability E is about 0.93. That is, the conductive film hardly absorbs the radio wave. In a heat reflecting glass according to the invention the reflection of radio waves such as, for example, AM or FM radio broadcast waves or television broadcast waves by the heat reflecting film is greatly reduced by appropriately dividing the film into segments, and hence the heat reflecting glass efficiently transmits radio waves.

EXAMPLE 1

A transparent and colorless glass plate was used as the substrate. The glass plate was about 520 mm square and had a thickness of about 10 mm. On one side of the glass plate a heat insulating two-layer coating was formed by a DC magnetron sputtering process. In the two-layer coating the inner layer in contact with the glass surface was a stainless steel (SUS 316) film having a thickness of about 30 nm and a sheet resistivity of about 3 Ω/□, and the outer layer was a titanium oxide film having a thickness of about 10 nm.

Using a YAG laser beam, linear slits having a width of about 0.5 mm were formed in the heat insulating coating to divide the coating into a plurality of segments. In sample A the coating was divided by vertical and horizontal slits into square segments in the manner as shown in FIG. 1. The square segments were 100 mm in the length of each side. In sample B the coating was divided by vertical slits into vertically elongate rectangular segments in the manner as shown in FIG. 2. The elongate segments were 100 mm in the horizontal width.

In a laboratory an electromagnetically shielded room was partitioned into two adjoining compartments by a wall, and an about 500 mm square opening was formed through the partition wall. The coated glass panel samples A and B were alternately fixed to the partition wall so as to stand vertical and close the opening in the wall. On the sample attached to the wall the coating was electrically insulated in a peripheral region with a width of about 30 mm. Then the coating surface of the sample on the wall was irradiated with horizontally polarized radio waves with frequencies ranging from 200 to 1000 MHz to measure the radio wave shielding effectivity of the coated glass panel sample at each of the employed frequencies. The radio waves with frequencies of 200 to 1000 MHz have wavelengths of 1500 to 300 mm. In both the samples A and B the square or rectangular segments of the coating were oriented such that the two 100 mm long sides of each segment were parallel to the direction of the electric field of the incoming radio waves. The length of 100 mm is from 1/15 to ⅓ of the wavelengths of 1500 to 300 mm.

Figure 3:
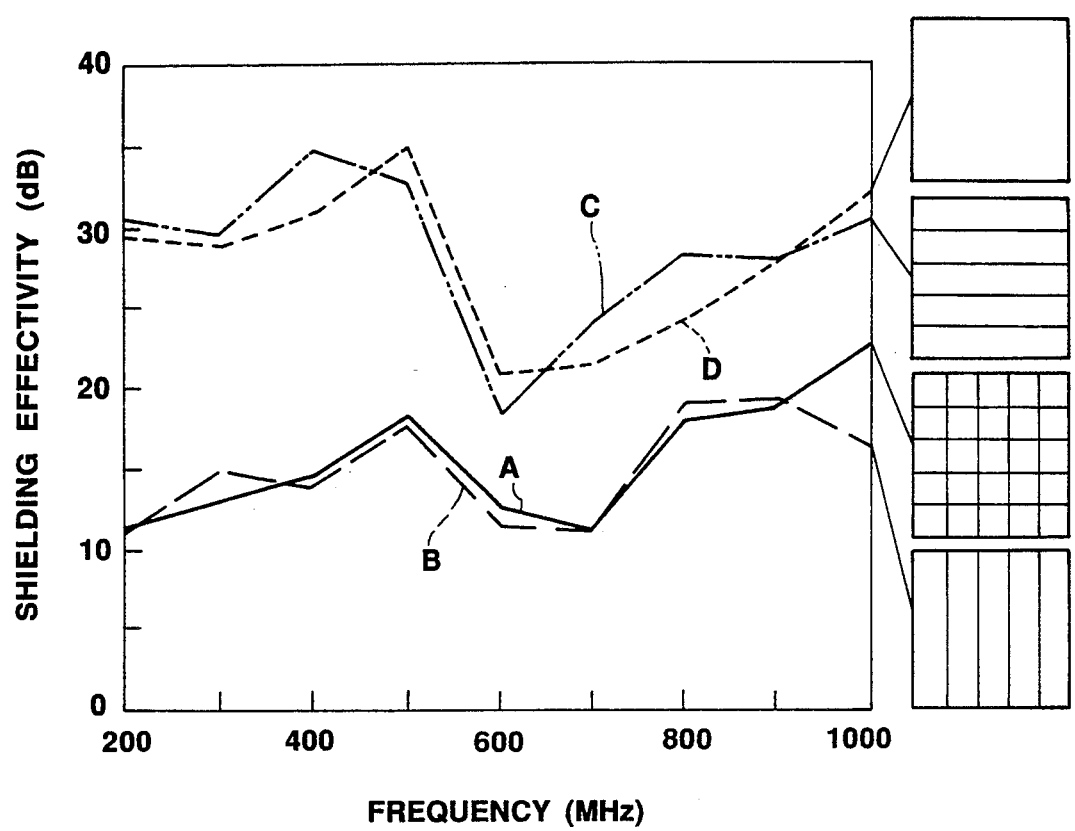
FIG. 3 is a graph showing the radio wave shielding effectivities of two types of heat reflecting coating films according to the invention and two different types of heat reflecting coating films not in accordance with the invention.

In FIG. 3 the curves A and B represent the shielding effectivities of the coated glass panel samples A and B, respectively.

For comparison, the sample B was further tested in a different orientation. That is, to close the opening in the aforementioned partition wall the sample B was attached to the wall such that the longer sides of the rectangular segments of the coating became horizontal. In FIG. 3 the curve C represents the result of this comparative test. As a reference, the same test was made on another sample in which the heat reflecting coating on the glass plate was left undivided. In FIG. 3 the curve D represents the result of this referential test. The curve C does not significantly differ from the curve D. By comparison with the curves C and D the radio wave shielding effectivities represented by the curves A and B are lower by about 20 dB on average. That is, in the samples A and B according to the invention the segmentalization of the coating had the effect of reducing the radio wave shielding effectivity of the coating. In this example the absorption of the incoming radio wave in the heat reflecting coating was almost negligible since the thickness of the low resistivity film was only about 30 nm. Therefore, it is certain that the reduction in the radio wave shielding effectivity was attributed to a reduction in the reflection of the incoming radio wave.

In using the present invention in a heat reflecting glass it is desirable that the heat reflecting film coated on the glass is not higher than 500 $\Omega/\square$ in surface resistivity. As is well known it is difficult to sufficiently reduce the solar radiation transmittance by using a coating film having a high surface resistivity. Furthermore, often it is necessary to pay attention to not only reflectance for total solar radiation but also reflectance for infrared rays. For example, heat reflecting glasses for buildings in northern districts are desired to be low in transmittance for infrared rays and not to be very low in transmittance for total solar radiation. The reflection of infrared rays is mainly attributed to plasma oscillation in the reflecting film, and hence the reflectance becomes higher as the surface resistivity of the film is made lower. In this invention it is preferable to use a heat reflecting film having a surface resistivity lower than about 350 $\Omega/\square$.

This invention is particularly concerned with a heat reflecting glass which is not higher than 60% in transmittance for total solar radiation, and in the case of a heat reflecting glass for architectural use it is preferable that the total solar radiation transmittance is from about 5% to about 30%. A heat reflecting film for use in this invention can be selected from known films. According to the need it is possible to use a multilayer coating. It is suitable to use a heat reflecting film not thicker than 100 nm, and preferably thinner than about 50 nm. When the substrate of the heat reflecting glass is a laminated glass it is an option to sandwich the heat reflecting film between the two sheets of glass.

In a heat reflecting glass according to the invention the heat reflecting film on or in the glass substrate is divided into a plurality of segments by slits formed in the film as is described hereinbefore. With respect to a radio wave of particular concern, the length or width (L in the foregoing description) of each segment in a direction parallel to the direction of the electric field of the radio wave must not be longer than ⅓ of the wavelength of the radio wave. For practical heat reflecting glasses it is suitable that the segment width L is not longer than 1/20 of the wavelength of the radio wave, and preferably not longer than 1/30 of the wavelength. For example, a radio wave having a frequency of 220 MHz (upper end of the VHF band for television broadcasting) has a wavelength of 1364 mm: 1/20 of 1364 mm is about 68 mm, and 1/30 of 1364 mm is about 45 mm. A radio wave having a frequency of 770 MHz (upper end of the UHV band for television broad-casting) has a wavelength of 390 mm: 1/20 of 390 mm is about 19 mm, and 1/30 of 390 mm is 13 mm.

The heat reflecting film is divided into segments by a plurality of slits which extend normal to the direction of the electric field of the radio wave concerned. For the reasons described hereinbefore, it is suitable that the width of each of these slits is in the range from 0.05 to 5 mm, and it is preferable that the slit width is from about 0.3 mm to about 3 mm. Besides the essential slits, optional slits may be formed in the heat reflecting film to segment the film in a grid pattern. Such optional slits extend parallel to the direction of the electric field of the radio wave concerned and hence are irrelevant to a reduction in the reflectance of the film for radio waves. There is no need of specifiying the minimum width of the optional slits. It is suitable that the width of the optional slits is not greater than 5 mm, and preferably not greater than about 3 mm, in view of the performance of the segmented heat reflecting film and the appearance of the heat reflecting glass.

EXAMPLE 2

A transparent and colorless glass plate was used as the substrate. The glass plate was about 520 mm square and had a thickness of about 10 mm. On one side of the glass plate a heat reflecing film of titanium nitride having a thickness of about 30 nm was formed by a DC magnetron reactive sputtering method using a metallic titanium target and nitrogen gas. The nitrogen gas was variously diluted with argon gas to produce six groups of samples different in the surface resistivity of the titanium nitride film. In the six groups the surface resistivities were about 3 $\Omega/\square$, about 50 $\Omega/\square$, about 100 $\Omega/\square$, about 350 Ω/□, about 500 Ω/□ and about 1000 Ω/□, respectively. The solar radiation transmittance of the heat reflecting glass of each group was as shown in Table 1.

The heat-reflecting titanium nitride film on each sample was divided into a plurality of vertically elongate segments in the manner as shown in FIG. 2 by forming vertical slits having a width of about 0.5 mm in the film by using a YAG laser beam. The samples of each of the above described six groups were divided into five sub-groups according to the horizontal width (L) of the vertically elongate segments of the film. In the first, second, third and fourth sub-groups the horizontal widths of the segments were 25 mm, 50 mm, 100 mm and 150 mm, respectively, and in the last sub-group the film was left undivided. The radio wave shielding effectivity of the segmented titanium nitride film on each sample was tested by the method employed in Example 1. Each sample was fixed to the wall partitioning the two electromagnetically shielded compartments so as to close the opening in the wall. In every sample on the wail the slits in the heat-reflecting titanium nitride film were oriented vertical, and the film was electrically insulated in a peripheral region with a width of about 30 mm. In that state the titanium nitride film on the sample was irradiated with a horizontally polarized radio wave having a frequency of 200 MHz (wavelength λ: 500 mm). The test results are shown in Table 1, wherein $T_S$ stands for solar radiation transmittance.

TABLE 1

| Surface Resistivity (Ω/□) | $T_s$ (%) | Radio Wave Shielding Effectivitiy (dB) | | | | |
|---|---|---|---|---|---|---|
| | | Width (L) of Segments of Film (mm) (L/λ in parenthesis) | | | | |
| | | 25 (1/60) | 50 (1/30) | 100 (1/15) | 150 (1/10) | Undivided Film |
| 3 | 1 | 2 | 3 | 10 | 12 | 30 |
| 50 | 6 | 2 | 3 | 10 | 12 | 18 |
| 100 | 10 | 2 | 3 | 9 | 10 | 13 |
| 350 | 27 | 1 | 1 | 4 | 5 | 6 |
| 500 | 50 | 1 | 1 | 3 | 3 | 4 |
| 1000 | 60 | 1 | 1 | 1 | 1 | 2 |

It is seen that the radio wave shielding effectivity of each titanium nitride film reduced by dividing the film into segments having a narrow width in a specific direction. For example, when the film having a surface resistivity of about 50 Ω/□ was divided into segments in which L/λ was 1/30 the radio wave shielding effectivity of the segmented film became nearly comparable to that of the undivided titanium film having a surface resistivity of about 500 Ω/□. That is, the invention can provide a heat reflecting glass which is very low in solar radiation transmittance and very low in reflectance for radio waves. In the case of using a heat reflecting film having a higher surface resistivity, such as about 350 Ω/□, to obtain a heat reflecting glass that transmits about 30% of solar radiation, the reflectance for radio waves can more easily be reduced by the segmentalization of the heat reflecting film. In this example too the absorption of the incoming radio wave by the titanium nitride film was almost negligible since the film thickness was only about 30 nm. The reduction in the radio wave shielding effectivity was attributed to a reduction in the reflection of the radio wave.

A heat reflecting glass according to the invention can be used as a vehicle window glass such as an automobile window glass. In recent automobiles it is not rarely to provide a window glass with an antenna for the reception of radio and/or television broadcast waves or for the transmission and reception of an ultrashort wave for a mobile phone or a personal radio. Every element of an automobile window glass antenna is a thin wire or foil of a metal or a thin conductor formed by applying a conductive paste to the window glass and baking the applied paste. Usually the antenna is provided on the inboard surface of the window glass or, in the case of a laminated glass pane, embedded in the window glass.

In the case of providing a vehicle window glass with a heat reflecting film and an antenna it is usual to dispose the antenna on the inner side of the heat reflecting film. Accordingly there arises a problem that the efficiency of the antenna is marred by the radio wave shielding effectivity of the heat reflecting film. This problem is insignificant when the heat reflecting film has a high surface resistivity, but, as mentioned hereinbefore, it is difficult to desirably reduce the solar radiation transmittance by using such a film. This problem can be solved by using the present invention, i.e. by suitably segmenting the heat reflecting film.

Figure 4:
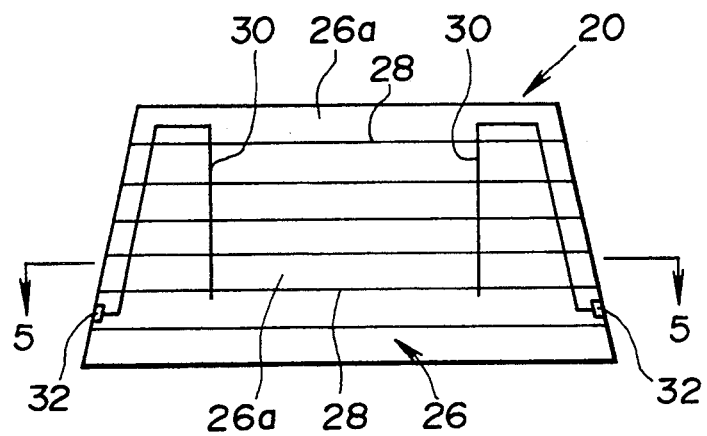
FIG. 4 is an elevational view of an automobile window glass provided with a heat reflecting coating film according to the invention and an antenna for the reception of broadcast waves.
Figure 5:
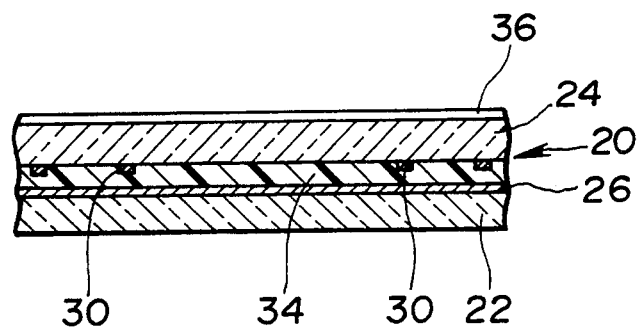
FIG. 5 is a sectional view taken along the line 5—5 in FIG. 4.

FIGS. 4 and 5 shows an automobile window glass 20 in which the present invention is embodied. The window glass 20 is provided with a heat reflecting film 26, which is divided by horizontal slits 28 into a plurality of segments 26a, and a pair of antenna elements 30 each of which is a linear element extending vertically. Indicated at 32 is a feed point for each antenna element 30. The vertical antenna elements 30 are employed for the purpose of efficiently receiving vertically polarized FM radio and/or television broadcast waves. To reduce reflection of vertically polarized incoming waves the heat reflecting film 26 is segmented by the horizontal slits 28, so that each segment 26a of the film 26 is elongate in the direction perpendicular to the vertial antenna elements 30. Preferably the vertical width of each segment 26a is not greater than 1/20 of the wavelength of a radio wave of particular concern such as, for example, a wave with a frequency of 220 MHz, and the width of each slit 28 is not greater than 5 mm.

Figure 6:
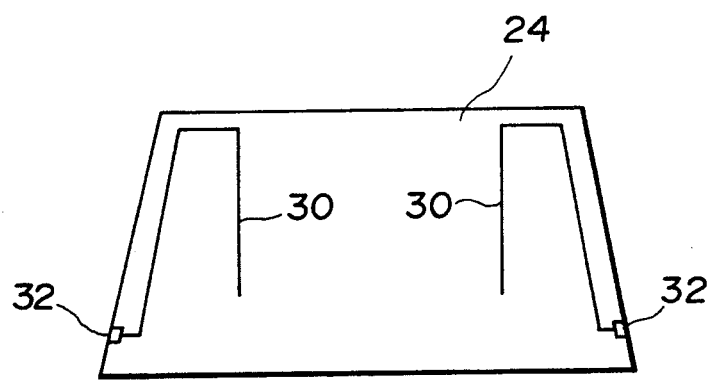
FIGS. 6 to 8 show three examples of antenna patterns which can be employed in a vehicle window glass according to the invention.

As shown in FIG. 5, this window glass 20 is a laminated glass pane using two glass plates 22 arid 24. The glass plate 22 provides the outboard surface of the window glass 20 and the glass plate 24 the inboard surface. The heat reflecting film 26 is formed on the inside surface of the glass plate 22 by a sputtering method. As shown in FIG. 6, the antenna elements 30 are formed on the inside surface of the glass plate 24, for example, by using thin wires. The glass plate 22 coated with the heat reflecting film 26 and the glass plate 24 provided with the antenna elements 30 are laminated by using a transparent plastic film 34 such as a polyvinyl butyral (PVB) film as an adhesive interlayer. This plastic film 34 is electrically insulating. Optionally, defogging heater strips 36 may be formed on the inboard surface of the window glass 20, for example, by applying a silver paste to the glass surface and baking the applied paste. Of course it is not essential to embed the heat reflecting film 26 and the antenna elements 30 in a laminated glass. Alternatively, the heat reflecting film 26 may be coated on the outboard surface of the window glass 20, and/or the antenna elements 30 may be disposed on the inboard surface of the window glass. However, it is unsuitable to provide both the heat reflecting film 26 and the antenna elements 30 on the same surface of the glass since the heat reflecting film 26 has a relatively low surface resistivity, which desired to be not higher than 500 Ω/□ as mentioned hereinbefore.

The heat reflecting film 26 is required to be transparent or nearly transparent. In other words, visible light transmittance of the film 26 should be above about 50%, and preferably above about 70%. Therefore, usually the heat reflecting film 26 is a film of ITO (indium-tin oxide) or SnO containing Sb or F, or a laminate of at least one film of Ag and at least one film of a suitable metal oxide such as ITO or ZnO. It is suitable that the film 26 is thinner than about 50 nm, and preferably thinner than about 35 nm. The use of this invention as an automobile window glass is particularly suitable when the total solar radiation transmittance of the window glass with the heat reflecting film 26 is below about 60%.

As to the segmented heat reflecting film 26, the preferable maximum width of each segment 26a in the direction parallel to the antenna elements 30 is as described hereinbefore. However, in an automobile window glass provided with an antenna for the reception of FM radio and/or television broadcast waves in the VHF band, the effect of segmenting the heat reflecting film 26 is practically appreciable when the segment width is narrower than 100 mm.

Figure 7:
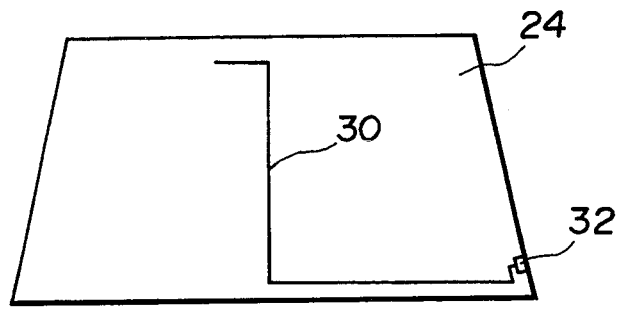

FIG. 7 shows another example of automobile window glass antennas for the reception of vertically polarized broadcast waves. In this antenna a single linear element 30, which is the principal element, extends vertically in a central region of the window glass.

Figure 8:
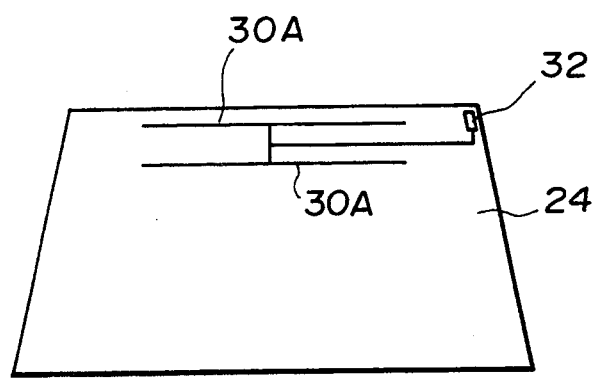

FIG. 8 shows an example of automobile window glass antennas for the reception of horizontally polarized broadcast waves. The principal elements of this antenna are two parallel linear elements 30A which extend horizontally in a region near the upper edge of the window glass. FIGS. 6 to 8 are examples of automobile window glass antenna constructions that can be employed in the present invention.

EXAMPLE 3

This example relates to an automobile window glass of the construction shown in FIGS. 4 to 6. A transparent and colorless glass plate having a thickness of about 2.0 mm was used as the glass plate 22 in FIG. 6 and a transparent and bronzy glass plate having a thickness of about 2.3 mm as the glass plate 24. As the heat insulating film 26, an ITO film having a thickness of about 30 nm was formed on the glass plate 22 by a sputtering method. The ITO film 26 had a surface resistivity of about 12 Ω/□. With this heat reflecting film 26 the visible light transmittance of the laminated glass pane was about 76%, and the solar radiation transmittance was about 58%.

Figure 9:
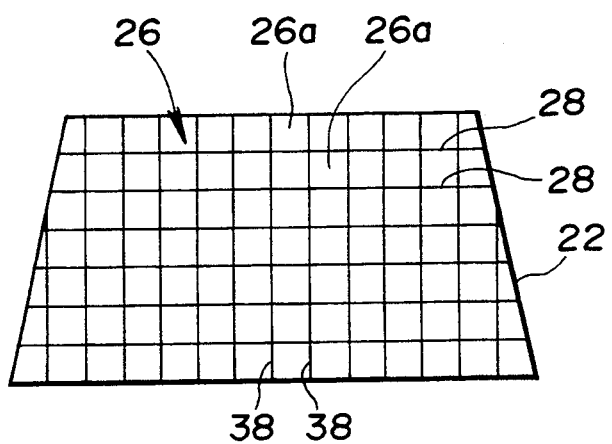
FIGS. 9 to 11 show three typical manners of segmenting the heat insulating film on a vehicle window glass according to the invention.
Figure 10:
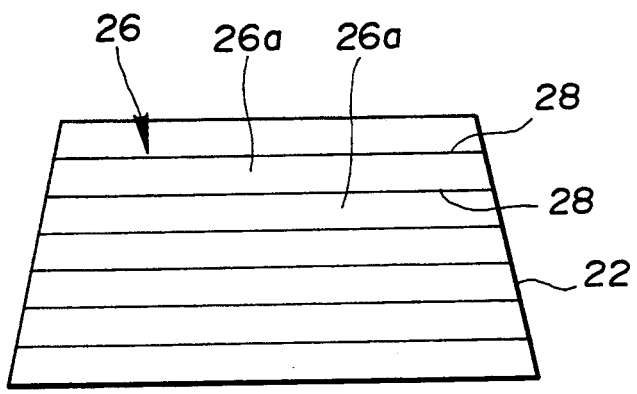
Figure 11:
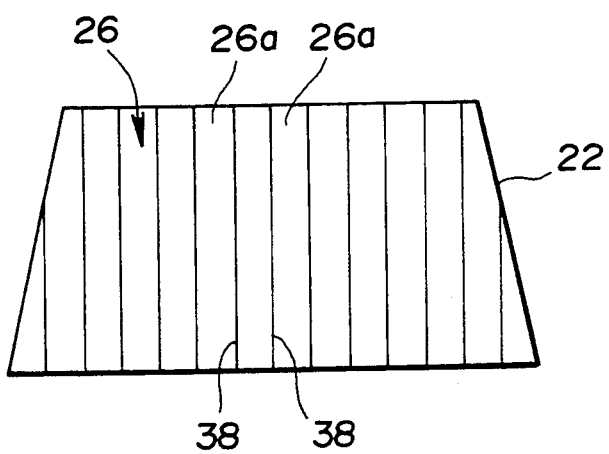

In this example five different samples were produced in respect of the heat reflecting film 26. In sample No. 1 the film 26 were divided into square segments 26a, as shown in FIG. 9, by forming horizontal slits 28 and vertical slits 38 in the film 26. The square segments 26a were about 20 mm in the length of one side, and the slits 28, 38 had a width of about 1 mm. As shown in FIG. 10, in sample No. 2 the film 26 was divided by horizontal slits 28 into horizontally elongate segments 26a each of which was about 20 mm in vertical width. The slit width was about 1 mm. As shown in FIG. 11, in sample No. 3 the film 26 was divided by vertical slits 38 into vertically elongate segments 26a each of which was about 20 mm in horizontal width. The slit width was about 1 mm. In sample No. 4 the film 26 was left undivided to use this sample as a comparative example. In sample No. 5 the heat reflecting film 26 was omitted to use this sample as a reference.

In every sample the window glass antenna was of the type shown in FIG. 6. The antenna elements 30 and the feed points 32 were disposed on the inside surface of the glass plate 24 in FIG. 5.

EXAMPLE 4

In this example the window glass of Example 3 was modified in the following two points.

First, as the heat reflecting film 26 a three-layer coating was made by alternately depositing two ZnO films and a Ag film. The particulars of the three-layer coating 26 are shown in Table 2. Second, the window glass antenna was of the type shown in FIG. 7 using the single vertical element 30.

In this example five different samples corresponding to the samples Nos. 1 to 5 in Example 1 were produced in respect of the heat reflecting film 26.

EXAMPLE 5

In this example the window glass of Example 3 was modified in three points.

First, as the heat reflecting film 26 a five-layer coating was made by alternately depositing three ITO films and two Ag films. The particulars of the five-layer coating 26 are shown in Table 2. Second, the window glass antenna was of the type shown in FIG. 8 using the two horizontal elements 30A.

In this example five different samples corresponding to the samples Nos. 1 to 5 in Example 1 were produced in respect of the heat reflecting film 26. As the third modification, in samples Nos. 1 to 3 the heat reflecting film 26 was divided into smaller segments. In sample No. 1 the square segments 26a (FIG. 9) were 10 mm in the length of one side; in sample No. 2 the horizontally elongate segments 26a (FIG. 10) were 10 mm in vertical width; in sample No. 3 the vertically elongate segments 26a (FIG. 11) were 10 mm in horizontal width.

TABLE 2

| | Heat Reflecting Coating | | | Characteristics | | |
|---|---|---|---|---|---|---|
| | Construction (thickness: nm) | Width of Segment (mm) | Slit Width (mm) | Surface Resistivity (Ω/□) | Visible Light Transmittance (%) | Solar Radiation Transmittance (%) |
| Ex. 3 | ITO monolayer (300) | 20 | 1 | 12 | 76 | 58 |
| Ex. 4 | ZnO/Ag/ZnO three-layer (40)/(10)/(40) | 20 | 1 | 10 | 72 | 54 |
| Ex. 5 | ITO/Ag/ITO/Ag/ITO five-layer (40)/(8)/(80)/(8)/(40) | 10 | 1 | 5 | 72 | 45 |

The window glass samples produced in Examples 3, 4 and 5 were used to test the performance of the antenna in each sample in respect of the reception of radio waves in the FM radio broadcasting band (76–90 MHz) and in the VHF television broadcasting band (90–220 MHz). Vertically polarized waves were used for the samples of Examples 3 and 4, and horizontally polarized waves for the samples of Example 5. In the test the radio waves reached the antenna through the outside glass plate (22 in FIG. 2) and the heat reflecting film 26. At each testing frequency the reception gain of the sample antenna was compared with the gain of a standard dipole antenna by taking the gain of the dipole antenna as the basis, 0 dB. The test results are shown in Table 3, wherein every gain value is an average in the 76–90 MHz band or in the 90–220 MHz band.

As can be seen in Table 3, when the heat reflecting coating film was segmented by slits perpendicular to the principal element(s) of the antenna the coating film became permeable to the radio waves to such an extent that the performance of the antenna was hardly obstructed by the existence of the coating film.

TABLE 3

| Division of Heat Reflecting Coating | Antenna Reception Gain (dB, vs. dipole antenna) | | | | | |
|---|---|---|---|---|---|---|
| | Antenna of FIG. 6 (Example 3) | | Antenna of FIG. 7 (Example 4) | | Antenna of FIG. 8 (Example 5) | |
| | FM band | TV VHF band | FM band | TV VHF band | FM band | TV VHF band |
| no coating (Reference) | −19.2 | −21.9 | −18.7 | −18.9 | −18.0 | −20.5 |
| FIG. 9 (square grid) | −19.0 | −19.9 | −18.9 | −19.0 | −18.2 | −20.6 |
| FIG. 10*1 (horizontal) | −19.3 | −22.2 | −18.6 | −18.7 | −26.8 | −31.2 |
| FIG. 11*2 (vertical) | −32.5 | −29.3 | −31.0 | −28.6 | −18.3 | −20.4 |
| not divided (Comparative Examples) | −33.8 | −31.1 | −34.5 | −31.2 | −28.5 | −33.6 |

*[1]Comparative Example with respect to antenna of FIG. 8.
*[2]Comparative Example with respect to antenna of FIG. 6 and FIG. 7.

What is claimed is:

1. A laminated panel having a substrate which is low in reflectance for radio waves and a layer disposed on said substrate which is relatively high in reflectance for radio waves, characterized in that said layer is divided into a plurality of discontinuous segments by a series of slits such that the width of each of said segments in a direction parallel to the direction of the electric field of a radio wave which will impinge on the laminated panel is not greater than $\frac{1}{3}$ of the wavelength of said radio wave, whereby the reflectance of said layer for said radio wave reduces.

2. A laminated panel according to claim 1, wherein said width of each segment is not longer than 1/20 of the wavelength of said radio wave.

3. A laminated panel according to claim 1, wherein said layer is divided into said segments by a combination of said series of slits and another series of slits which cross said series of slits.

4. A laminated panel according to claim 1, wherein said radio wave is a television broadcast wave.

5. A heat reflecting glass panel having a heat reflecting layer over a surface of a glass plate, said heat reflecting layer having a surface resistivity not higher than 500 Ω/□, characterized in that said heat reflecting layer is divided into a plurality of discontinuous segments by a series of slits such that the width of each of said segments in a direction parallel to the direction of the electric field of a radio wave which will impinge on the heat insulating glass panel is not greater than 1/20 of the wavelength of said radio wave, whereby the reflectance of the heat reflecting layer for said radio wave reduces.

6. A heat insulating glass panel according to claim 5, wherein the width of each of said slits is in the range from 0.05 to 5 mm.

7. A heat insulating glass panel according to claim 6, wherein the width of each of said slits is not greater than 3 mm.

8. A heat insulating glass panel according to claim 5, wherein the surface resistivity of said heat reflecting layer is not higher than 350 Ω/□.

9. A heat insulating glass panel according to claim 5, wherein said heat reflecting layer is divided into said segments by a combination of said series of slits and another series of slits which cross said series of slits.

10. A heat reflecting glass panel according to claim 9, wherein the width of each of said another series of slits is not greater than 5 mm.

11. A heat reflecting glass panel according to claim 5, wherein said width of each segment is not greater than 1/30 of the wavelength of said radio wave.

12. A heat reflecting glass panel according to claim 5, wherein the solar radiation transmittance of the heat reflecting glass panel is not higher than 50%.

13. A heat reflecting glass panel according to claim 12, wherein said solar radiation transmittance is in the range from about 5% to about 30%.

14. A heat reflecting glass panel according to claim 5, wherein said heat reflecting layer is not thicker than 100 nm.

15. A heat reflecting glass panel according to claim 5, wherein said radio wave is a television broadcast wave.

16. A heat reflecting glass panel according to claim 5, wherein said radio wave is a radio broadcast wave.

17. A heat insulating glass panel according to claim 5, wherein the width of each of said slits is not greater than 5 mm.

18. A vehicle window glass comprising a glass plate, a heat reflecting layer which lies over a glass surface of said glass plate having a surface resistivity not higher than 500 Ω/□ and an antenna which is disposed on another glass surface of said glass plate including a linear element as a principal element of the antenna, characterized in that said heat reflecting layer is divided into a plurality of discontinuous segments by a series of slits such that the width of each of said segments in the direction normal to said linear element of said antenna is not greater than 1/20 of the wavelength of a radio wave which is to be received by said antenna, whereby the reflectance of said heat reflecting layer for said radio wave reduces.

19. A vehicle window glass according to claim 18, wherein the width of each of said slits is in the range from 0.05 to 5 mm.

20. A vehicle window glass according to claim 18, wherein the width of each of said slits is not greater than 3 mm.

21. A vehicle window glass according to claim 18, wherein said heat reflecting layer is divided into said segments by a combination of said series of slits and another series of slits which cross said series of slits.

22. A vehicle window glass according to claim 21, wherein the width of each of said another series of slits is not greater than 5 mm.

23. A vehicle window glass according to claim 18, wherein said linear element of said antenna extends substantially vertically.

24. A vehicle window glass according to claim 18, wherein said linear element of said antenna extends substantially horizontally.

25. A vehicle window glass according to claim 18, wherein the window glass with said heat reflecting layer is lower than about 60% in total solar radiation transmittance.

* * * * *